United States Patent
Bae

(10) Patent No.: US 6,177,924 B1
(45) Date of Patent: Jan. 23, 2001

(54) TOUCH PAD MOUNTING DEVICE FOR ELECTRONIC SYSTEM

(75) Inventor: Jae-Yong Bae, Suwon (KR)

(73) Assignee: SamSung Electronics Co., Ltd., Suwon (KR)

( * ) Notice: Under 35 U.S.C. 154(b), the term of this patent shall be extended for 0 days.

(21) Appl. No.: 09/219,518

(22) Filed: Dec. 23, 1998

(30) Foreign Application Priority Data

Dec. 24, 1997 (KR) .................................................. 97-73686

(51) Int. Cl.⁷ ....................................................... G06F 1/16
(52) U.S. Cl. ........................... 345/157; 361/683; 361/686
(58) Field of Search ................................. 361/683, 686; 345/157

(56) References Cited

U.S. PATENT DOCUMENTS

| | | |
|---|---|---|
| 4,831,359 | 5/1989 | Newell . |
| 4,988,982 | 1/1991 | Rayner et al. . |
| 5,339,213 | 8/1994 | O'Callaghan . |
| 5,793,355 | 8/1998 | Youens . |
| 5,914,703 * | 6/1999 | Herng-Chuen ........................ 345/157 |

* cited by examiner

Primary Examiner—Leo P. Picard
Assistant Examiner—Yean-Hsi Chang
(74) Attorney, Agent, or Firm—Robert E. Bushnell, Esq.

(57) ABSTRACT

A device for mounting a touch pad in an electronic system may be constructed using a touch pad supporting case that secures the touch pad to an inner surface of the housing that encloses the electronic system. The touch pad supporting case is made of a metallic material and is free from any plastics. This allows the touch pad unit to be thinner and lighter and avoids the need for performing a plating process on a plastic touch pad supporting case. This removes a safety hazard at manufacturing plants by avoiding exposing workers to the contaminants generated by the plating process.

15 Claims, 7 Drawing Sheets

TOUCH PAD MOUNTING DEVICE FOR ELECTRONIC SYSTEM

CLAIM OF PRIORITY

This application makes reference to, incorporates the same herein, and claims all rights accruing thereto under 35 U.S.C. §119 through my patent application entitled Contrivance for Mounting a Pointing Device in an Electronic System earlier filed in the Korean Industrial Property Office on the 24th day of Dec. 1997 and there duly assigned Ser. No. 1997/73686.

BACKGROUND OF THE INVENTION

1. Field of the Invention

The present invention concerns a device for mounting a cursor movement control device in an electronic system such as computer and, more specifically, to a device for mounting a touch pad device in a portable computer.

2. Background Art

Various electromechanical devices are known in the art for effecting the movement of a cursor on a display device using control signals. For example, so-called "joy-sticks" are frequently used with computing equipment to move a cursor, or another image, that is displayed on the face of the display device. A typical joy-stick operates by producing control signals by means of electrical potentiometers linked to the movable actuating rod where the magnitude of the signal determines the rate of motion and the polarity of the signal determines the direction of cursor movement. Another well known device is the so-called "track ball". The track ball has a spherical member is mounted in a socket that allows the spherical member to rotate about any axis. By rotating the track ball control signals are generated that direct the motion of a cursor, or another image, along the face of a display device. Similar to the track ball is the so-called "mouse" that has a spherical member covered by a palm-sized housing. By pushing the palm-sized housing along a supporting surface the spherical member is rotated and signals are sent to the computer that control the motion of a cursor, or another image, along the face of a display device.

More recently developed than the above devices is the "touch pad". The touch pad allows a user to manipulate the position of a cursor, or another image, along the face of a display device by sliding a finger over the surface of the touch-pad. The touch pad can be made using a printed circuit board that has a pattern of conductors formed in a grid, using a predetermined spacing, that may is juxtaposed with a flexible plastic insulating layer having a pattern of metallization on the under surface. By depressing the flexible layer against the underlying printed circuit grid, signals are produced that are directly related to the particular point on the pad that is being touched.

A touch pad may be designed with several buttons that function similarly to the right and left buttons of a mouse. In the process of mounting a touch pad onto the housing of a portable computer, the touch pad plate is placed against the plastic housing and covered by a plastic mounting case. To protect the touch pad from electromagnetic interference it is necessary to plate the plastic case prior to using the plastic case to support the touch pad plate. The plating process, however, generates contaminants and can adversely affect the workers in the manufacturing facility where the touch pad device is produced. In addition, the use of the plastic mounting case, in addition to the plated metal, increases the weight of the portable computer and causes the thickness of the touch pad unit to be increased, thus restricting the design flexibility of the portable computer.

As such, I believe that it may be possible to improve on the contemporary art by providing a touch pad mounting device that does not require a plating process, that eliminates the use of a plastic case to support the touch pad device, that reduces the thickness of the touch pad unit, that increases the safety of workers in facilities that assemble the touch pads, and that reduces the weight of electrical systems that use the touch pad mounting device.

SUMMARY OF THE INVENTION

Accordingly, it is an object of the present invention to provide an improved touch pad mounting device.

It is another object to provide a touch pad mounting device that does not require a plating process, thus increasing the safety of workers in facilities that produce touch pad devices.

It is still another object to provide a touch pad mounting device that eliminates the use of a plastic case to support the touch pad device.

It is yet another object to provide a touch pad mounting device that reduces the thickness of the touch pad unit.

It is still yet another object to provide a touch pad mounting device that reduces the weight of electrical systems that use the touch pad mounting device.

To achieve these and other objects a device for mounting a touch pad in an electronic system may be constructed using an opening formed in the housing to expose the touch pad that is attached to the inner surface of the housing. A plurality of lugs are formed on the inside of the housing around the opening to engage the touch pad supporting case that secures the touch pad to the housing. The touch pad supporting case is made of a metallic material and is free from any plastics. This allows the touch pad unit to be thinner and lighter and avoids the need for performing a plating process on a plastic touch pad supporting case. This removes a safety hazard at manufacturing plants by avoiding exposing workers to the contaminants generated by the plating process.

According to another embodiment of the present invention, a device for mounting a touch pad with a selective button set, or a plurality of buttons, to input a selection signal in an electronic system such as notebook computer having a system unit mounted in a housing may be constructed using a second opening formed in the housing to expose selective button set along with the touch pad structure described above. Plugs are formed on the inside of the housing near the selective button set mounting opening, and slots are formed in one end region of the selective button set. The selective button set is directly mounted in the second opening by means of the plugs fixedly being inserted into the slots of the selective button set. Preferably, the selective button set includes a first and a second selective button, and the selective button set mounting opening, or second opening, includes a first and a second opening part for respectively receiving the first and second selective buttons. In addition, a button stopper is further provided between the first and second opening parts to limit the downward movement of the first and second selective buttons.

The metal plate to fixedly mount the touch pad serves to shield electromagnetic interferences. It may be preferably made of a thin stainless steel plate with a thickness less than one millimeter to strengthen the device as well as reduce the weight and thickness of the housing.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
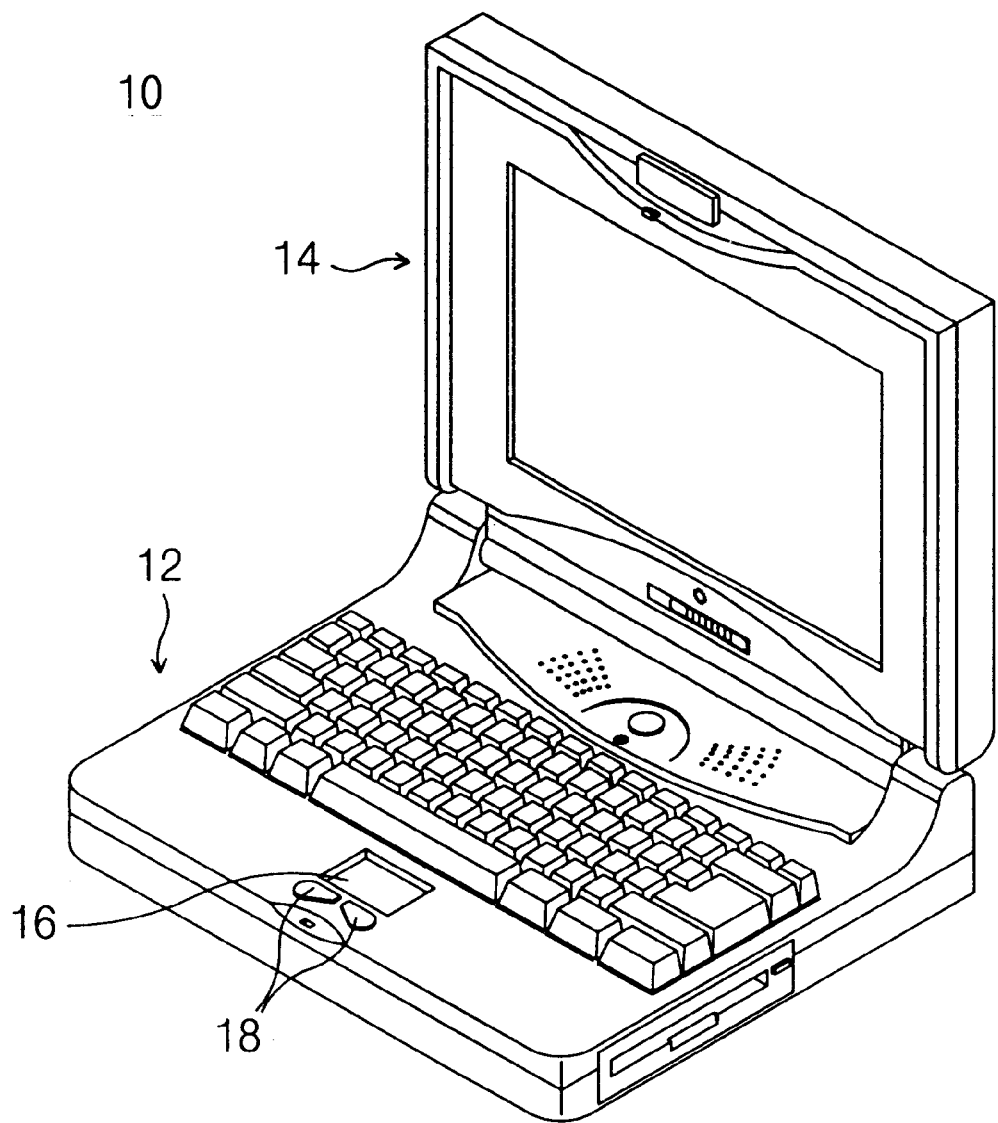
FIG. 1 is a perspective view illustrating a notebook computer.
Figure 2:
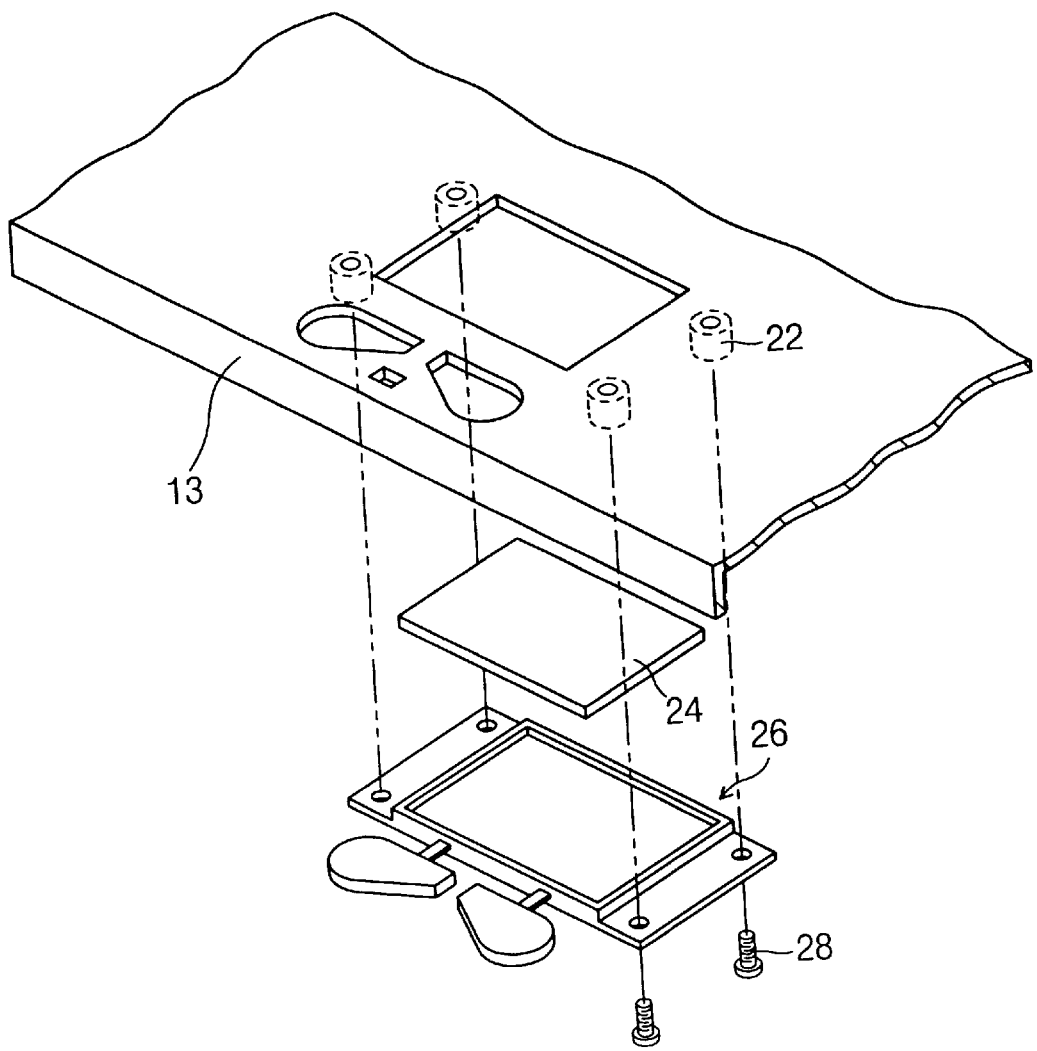
FIG. 2 is an exploded view illustrating the mounting of a touch pad in a notebook computer.

Turning now to the drawings, FIG. 1 illustrates notebook computer 10 that may be constructed using system unit 12 and display panel 14. Generally, the housing of system unit 12 is provided with a keyboard and touch pad 16 with selective button set 18 working like the right and left buttons of a mouse. Before mounting touch pad 16, touch pad plate 24 is placed, as shown in FIG. 2, on plastic mounting case 26, which is fixedly mounted to housing 13 by means of screws 28 that are inserted into bosses 22 that are formed on housing 13. Plastic mounting case 26 must be plated to shield electromagnetic interferences.

Figure 3:
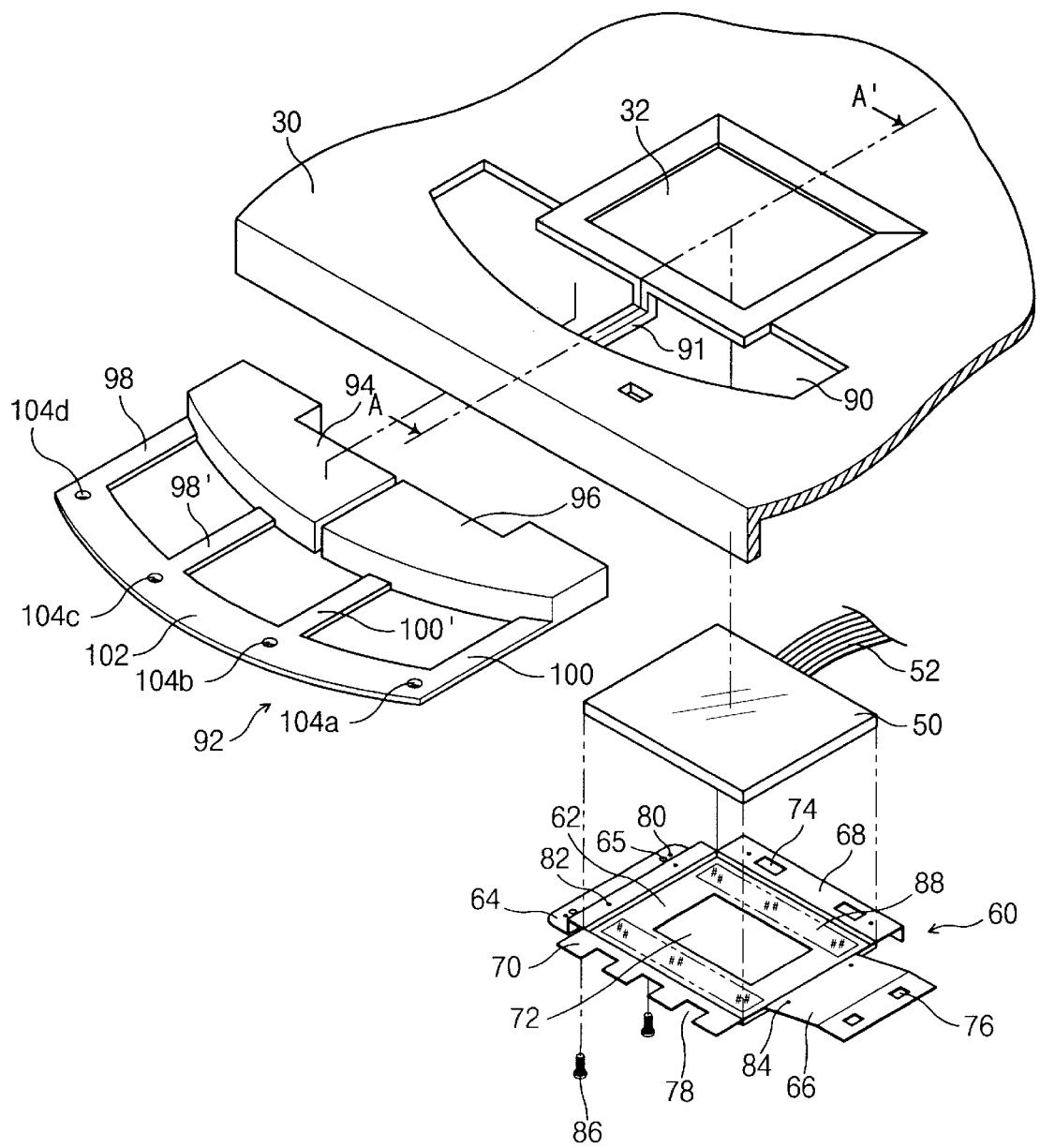
FIG. 3 is an exploded view illustrating a device as constructed according to the principles of the present invention for mounting a touch pad with a selective button set in a notebook computer.
Figure 4:
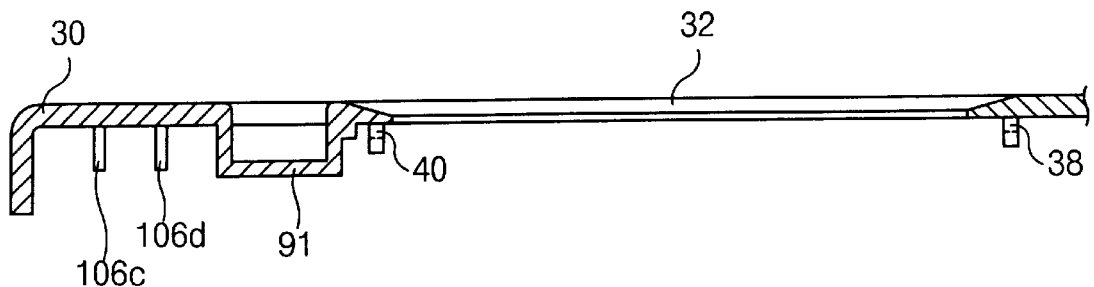
FIG. 4 is a cross sectional view taken along line A–A' of FIG. 3.
Figure 5:
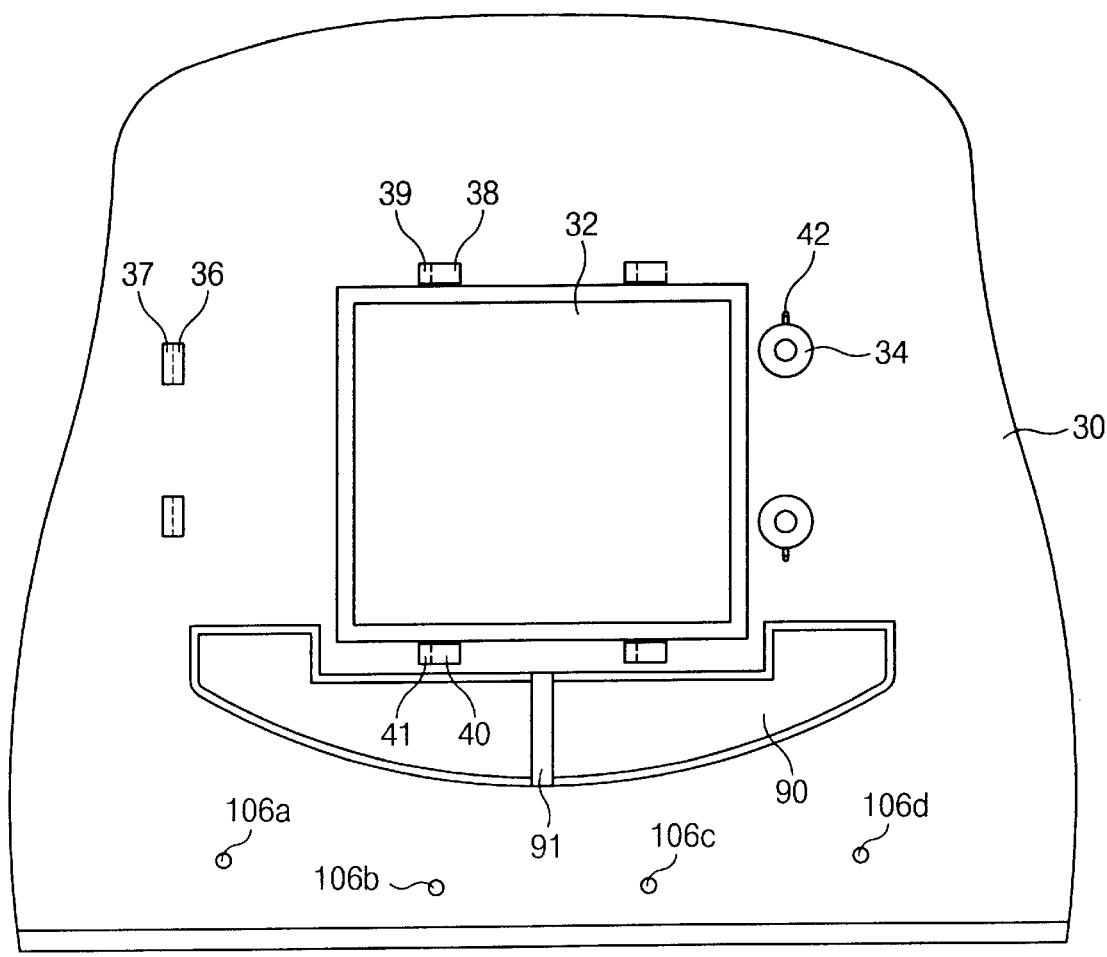
FIG. 5 is a plane view illustrating the inner surface of the housing of the electronic system to which the touch pad is mounted along with the selective button set.

FIGS. 3 through 5 illustrate a device for mounting touch pads as constructed according to the principles of the present invention. Housing 30 of the system unit, or base, of a notebook computer provided with a touch pad mounting opening, also referred to in the claims as an opening or a first opening, 32, around which fixing projections such as lugs and bosses are formed to hold metal plate, also referred to as a touch pad supporting case in the claims, 60. Metal plate 60 secures touch pad 50 onto the inside of the housing towards the touch pad mounting opening 32. In addition, selective button set, also referred to in the claims as a plurality of buttons, 92 is mounted in a selective button set mounting opening, also referred to in the claims as a second opening, 90 formed adjacent to the touch pad mounting opening in the housing, so that the buttons located on the selective button set may be pressed from outside of the housing. Formed across selective button set mounting opening 90 is button stopper 91 that limits the downward movement of buttons of selective button set 92, as shown in FIGS. 3 and 4. Selective button set 92 may be constructed using first selective button 94, second selective button 96, resilient strips 98, 98', 100, 100', and connecting strip 102. First and second selective buttons 94 and 96 are symmetrically positioned in selective button set mounting opening 90 with button stopper 91 facing the lower surfaces of the adjacent parts of the two selective buttons 94 and 96, as shown in FIG. 5. The two resilient strips 98 and 98' are connected between first selective button 94 and connecting strip 102, and the other two resilient strips 100 and 100' are connected between second selective button 96 and connecting strip 102. The resilient strips serve to recover the selective buttons after they have been depressed by a user. Connecting strip 102 connects the selective button set with the housing. In the present embodiment, a plurality of protuberances, also referred to as a plurality of plugs in the claims, 106a, 106b, 106c, 106d are integrally formed on the inside of the housing and can be inserted into corresponding slots 104a, 104b, 104c, 104d that formed in connecting strip 102. The protuberances and slots may be firmly fastened by means of heating.

Referring to FIG. 5, to attach metal plate 60 to the inside of the housing, there are provided bosses 34 and lugs 36, 38, 40 on the inside of the housing around touch pad mounting opening 32. Lugs 36, 38, 40 are formed on the peripheral regions of the touch pad mounting opening 32 except 18 the peripheral region where bosses 34 are formed. Lugs 36, 38, 40 respectively have hooks 37, 39, 41 formed facing the direction opposite to that of bosses 34. It is desirable to have at least three lugs. Metal plate 60 supports the touch pad 50 towards the touch pad mounting opening 32, fastened to the bosses 34 and lugs 36, 38, 40. To this end, the metal plate 60 includes concave receiving part 62, fixing part 64, resilient part 66, first connecting part 68 and second connecting part 70. Receiving part 62 has cable aperture 72 for holding touch pad 50. Through cable aperture 72 is inserted a cable for connecting touch pad 50 with the electronic system. Fixing part 64 is extended from one side of receiving part 62 by a given interval, having slots 65 connected with bosses 34 by means of fasteners 86. Resilient part 66 is extended from the side of receiving part 62 opposite to fixing part 64 by a given interval, having slots 76 fastened to lugs 36 on the housing. Resilient part 66 is inclined by a given angle with respect to receiving part 62, as shown in FIG. 3, to impart a resiliency to the receiving part. First connecting part 68 has slots 74 fastened to lugs 38. Second connecting part 70 is extended from the side of receiving part 62 opposite to first connecting part 68, having slots or cuts 78 fastened to lugs 40. In addition, fixing and resilient parts 64 and 66 are provided with protuberances 82, 84 to assist the mounting of touch pad 50 to housing 30. Protuberances 82, 84 are formed adjacent to the sides of resilient part 62 towards touch pad 50. Also formed the inside of housing 30 adjacent to bosses 34 are further protuberances 42 to fasten to slots 80 formed in fixing part 64. Slots 80 and protuberances 42 are to facilitate the connection of fixing part 64 to the bosses.

Figure 6:
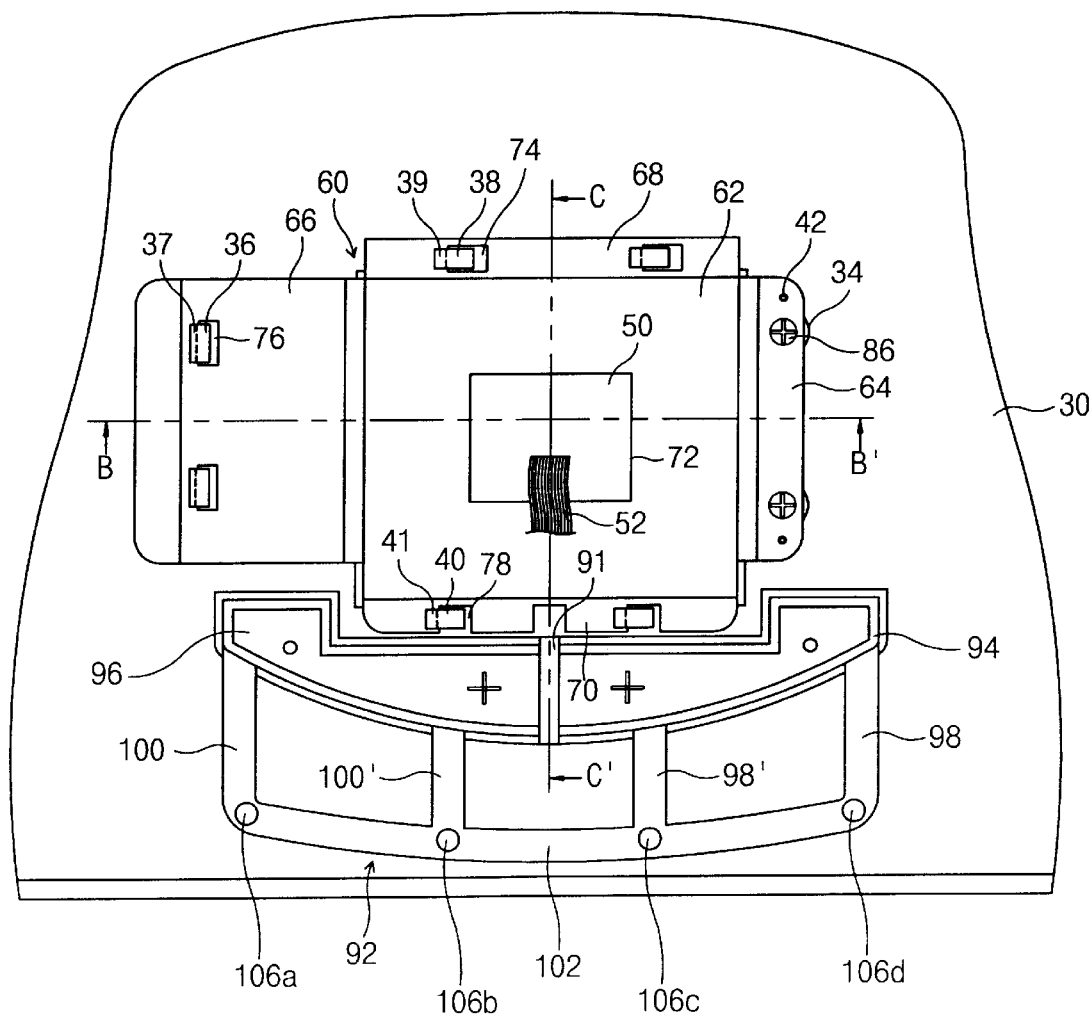
FIG. 6 is a view showing the touch pad and selective button set mounted to the inner surface of the housing of the electronic system.
Figure 7:
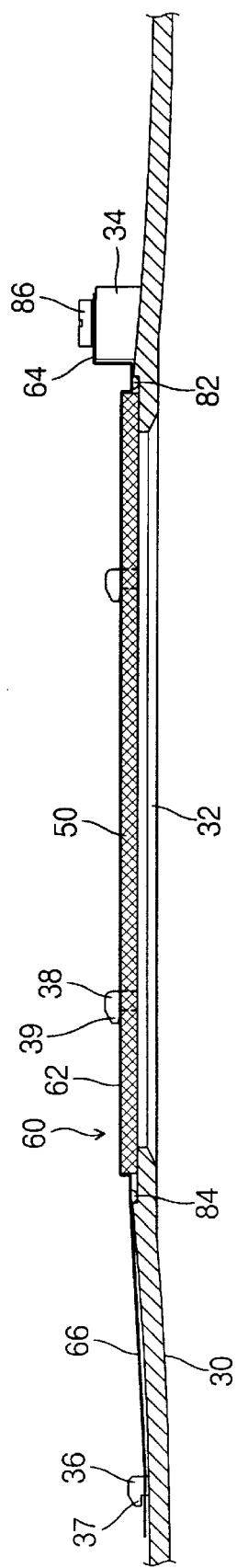
FIG. 7 is a partial cross sectional view taken along line B–B' of FIG. 6.
Figure 8:
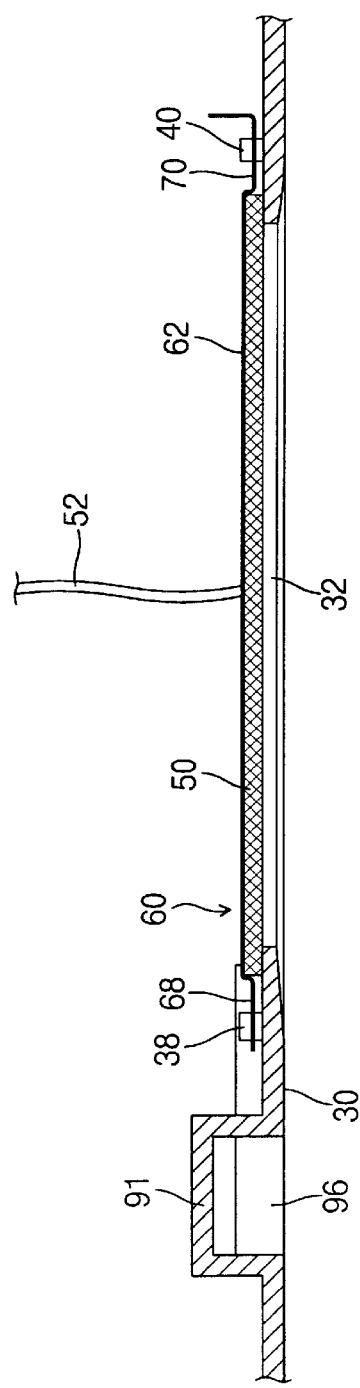
FIG. 8 is a partial cross sectional view taken along line C–C' of FIG. 6.

The mounting of the touch pad on the inside of the housing, as shown in FIGS. 6 through 8, starts with resilient part 66 of metal plate 60 being fastened to lugs 36 with slots 76 held by the hook of lug 36. At the same time, first and second connecting parts 68 and 70 are respectively connected to lugs 38 and 40. Then, pulling metal plate 60 towards bosses 34, fixing part 64 is securely placed on bosses 34 by means of slots 80 receiving protuberances 42.

Finally fasteners 86 are turned through slots 65 of fixing part 64 into bosses 34.

Meanwhile, first and second selective buttons 94 and 96 of the selective button set 92 are inserted in selective button set mounting opening 90 while connecting strip 102 is connected to the inside of the housing by means of the slots 104a, 104b, 104c, 104d respectively holding plugs 106a, 106b, 106c, 106d. The slots and plugs may be firmly fastened with each other by the heat treatment s usually called heat stake. Provided on the lower side of the selective button set 92 is a circuit board with switches that act cooperatively with the touch pad.

Figure 9A:
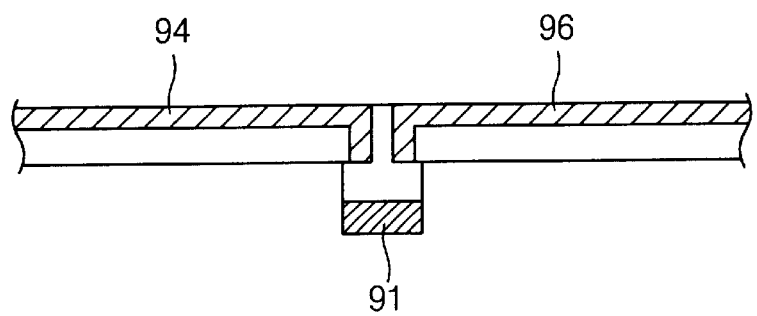
FIG. 9A is a partial cross sectional view illustrating the position of the first and second selective buttons when they are not externally pressed.
Figure 9B:
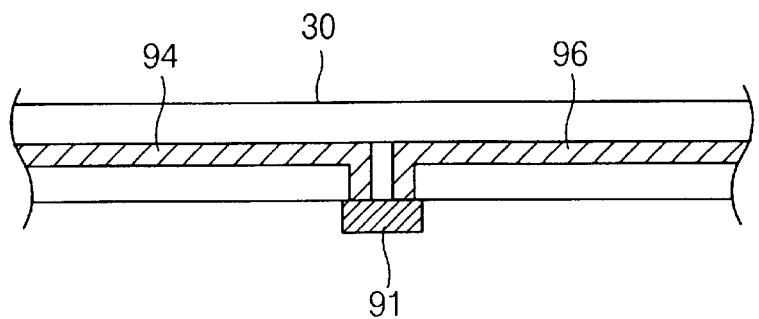
FIG. 9B is a partial cross sectional view illustrating the position of the first and second selective buttons when they are externally pressed.

Referring to FIGS. 9A and 9B, first and second selective buttons 94 and 96 serve as the left and right buttons of the mouse, and may be pressed separately or simultaneously. Pressing the first and second selective buttons after locating the pointer by touching the touch pad, the selective buttons 94 and 96 descends downwards. The descending movement of the buttons is limited by the button stopper 91. The position of the button stopper 91 may be determined according to the switches operated by the buttons 94 and 96.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A device for mounting a touch pad in an electronic system, comprising:
   a housing enclosing said electronic system;
   said housing bearing an opening facilitating tactile access, from outside said housing, to said touch pad;
   a touch pad supporting case attachable to an inner surface of said housing to securely position said touch pad in a position aligning said touch pad with said opening in said housing;
   said touch pad supporting case being formed of a metallic material and being free from plastic materials;
   a plurality of lugs attached to said inner surface of said housing proximate to said opening; and
   said touch pad supporting case bearing a plurality of slots receivably engaging said plurality of lugs to secure said touch pad supporting case to said inner surface of said housing.

2. The device of claim 1 further comprised of said touch pad supporting case being formed of stainless steel.

3. The device of claim 2, further comprised of said touch pad supporting case being under one millimeter thick.

4. A device for mounting a touch pad in an electronic system, comprising:
   a housing enclosing said electronic system and comprising:
      said housing bearing a first opening facilitating tactile access, from outside said housing, to said touch pad; and
      said housings bearing a second opening positioned operably proximate to said first opening;
   a touch pad supporting case attachable to an inner surface of said housing to securely position said touch pad in a position aligning said touch pad with said first opening in said housing;
   said touch pad supporting case being formed of a metallic material and being free from plastic materials; and
   a plurality of buttons attached to an inner surface of said housing and positioned to align said plurality of buttons with said second opening, said second opening facilitating tactile contact, from outside said housing, with said plurality of buttons, mounted inside said housing;
   a plurality of lugs attached to said inner surface of said housing, proximate to said first opening; and
   said touch pad supporting case bearing a plurality of slots receivably engaging said plurality of lugs to secure said touch pad supporting case to said inner surface of said housing.

5. The device of claim 4, further comprising a plurality of plugs formed on the inner surface of said housing operably proximate to said first opening.

6. The device of claim 5, further comprising a second plurality of slots formed on said plurality of buttons.

7. The device of claim 6, further comprised of said plurality of buttons are directly mounted in said second opening via said plurality of plugs being engaged with said second plurality of slots.

8. The device of claim 7, further comprising a button stopper attached proximate to said second opening to limit the downward movement of said plurality of buttons.

9. The device of claim 8 further comprised of said touch pad supporting case being formed of stainless steel.

10. The device of claim 9, further comprised of said touch pad supporting case being under one millimeter thick.

11. A device for mounting a touch pad in an electronic system, comprising:
   a housing enclosing said electronic system and comprising:
      said housing bearing a first opening, facilitating tactile access, from outside said housing, to said touch pad;
      a plurality of lugs attached to said inner surface of said housing proximate to said first opening; and
      said housing bearing a second opening positioned operably proximate to said first opening;
   a touch pad supporting case attachable to an inner surface of said housing to securely position said touch pad in a position aligning said touch pad with said first opening in said housing;
   said touch pad supporting case being formed of stainless steel, being free from plastic materials, being less than one millimeter thick, and bearing a plurality of slots receivably engaging said plurality of lugs of said housing to secure said touch pad supporting case to said inner surface of said housing; and
   a plurality of buttons attached to an inner surface of said housing and positioned to align said plurality of buttons with said second opening, said second opening facilitating tactile contact, from outside said housing, with said plurality of buttons, mounted inside said housing.

12. The device of claim 11, further comprising a plurality of plugs formed on the inner surface of said housing operably proximate to said first opening.

13. The device of claim 12, further comprising a second plurality of slots formed on said plurality of buttons.

14. The device of claim 13, further comprised of said plurality of buttons are directly mounted in said second opening via said plurality of plugs being engaged with said second plurality of slots.

15. The device of claim 14, further comprising a button stopper attached proximate to said second opening to limit the downward movement of said plurality of buttons.

* * * * *